United States Patent
Yoshida et al.

(10) Patent No.: US 6,896,941 B1
(45) Date of Patent: May 24, 2005

(54) POLYESTER FILM FOR USE AS AN INK IMAGE RECEIVING BASE FILM AND INK

(75) Inventors: Tetsuo Yoshida, Sagamihara (JP);
Satoshi Kitazawa, Sagamihara (JP);
Takashi Saigo, Sagamihara (JP);
Masayuki Fukuda, Sagamihara (JP);
Shinji Yano, Sagamihara (JP)

(73) Assignee: Teijin Limited, Osaka (JP)

(*) Notice: Subject to any disclaimer, the term of this patent is extended or adjusted under 35 U.S.C. 154(b) by 0 days.

(21) Appl. No.: 09/762,145

(22) PCT Filed: May 12, 2000

(86) PCT No.: PCT/JP00/03060

§ 371 (c)(1),
(2), (4) Date: Jan. 31, 2001

(87) PCT Pub. No.: WO00/73081

PCT Pub. Date: Dec. 7, 2000

(30) Foreign Application Priority Data

Jun. 1, 1999 (JP) .......................................... 11-153539
Jun. 30, 1999 (JP) .......................................... 11-185184
Jun. 30, 1999 (JP) .......................................... 11-185185

(51) Int. Cl.$^7$ .............................................. B41M 5/40
(52) U.S. Cl. .................. 428/32.18; 428/32.19; 428/32.2; 428/32.28; 428/32.35; 347/105
(58) Field of Search .......................... 428/32.18, 32.19, 428/32.2, 32.28, 32.35, 195, 206, 213, 325, 331, 480; 347/105

(56) References Cited

U.S. PATENT DOCUMENTS

| | | | | |
|---|---|---|---|---|
| 4,910,235 A | | 3/1990 | Satake et al. | |
| 5,457,017 A | * | 10/1995 | Kimura et al. | 430/533 |
| 5,556,712 A | * | 9/1996 | Kimura et al. | 428/480 |
| 5,593,819 A | * | 1/1997 | Kimura et al. | 430/533 |
| 5,908,688 A | * | 6/1999 | Okada et al. | 428/216 |
| 5,958,552 A | * | 9/1999 | Fukuda et al. | 428/141 |
| 6,127,473 A | * | 10/2000 | Yoshida et al. | 524/493 |
| 6,140,013 A | * | 10/2000 | Kudo et al. | 430/273.1 |
| 6,254,996 B1 | * | 7/2001 | Fukuda et al. | 428/480 |
| 6,420,010 B1 | * | 7/2002 | Hasegawa et al. | 428/141 |
| 6,440,532 B1 | * | 8/2002 | Ogawa et al. | 428/141 |

FOREIGN PATENT DOCUMENTS

| | | |
|---|---|---|
| EP | 0 835 752 A2 | 10/1997 |
| EP | 0 911 152 A2 | 10/1998 |
| EP | 0 953 440 A2 | 4/1999 |
| EP | 0 728 801 A | 9/2004 |
| JP | A-64-36479 | 2/1989 |
| JP | A-1-95091 | 4/1989 |
| JP | A-2-26739 | 1/1990 |
| JP | A-7-157581 | 6/1995 |
| JP | A-10-287039 | 10/1998 |
| JP | 11-977 | 1/1999 |

* cited by examiner

*Primary Examiner*—B. Shewareged
(74) *Attorney, Agent, or Firm*—Sughrue Mion, PLLC

(57) ABSTRACT

A white biaxially oriented polyester film for use as a base film for receiving an ink jet printer image and a base film for receiving an ink jet printer image which satisfy the following requirements (1) to (4):

(1) the content of titanium oxide particles having an average particle diameter of 0.1 to 0.5 $\mu$m in the polyester film is 5 to 20 wt %;
(2) the polyester film has an average glossiness of 65 to 95%;
(3) the polyester film has an X-ray diffraction intensity ratio (F-1/F-2) represented by the following formal (1):

$$0.05 \leq F\text{-}1/F\text{-}2 \leq 0.15 \quad (1)$$

wherein (F-1) is an X-ray diffraction intensity on a plane (1$\bar{1}$0) parallel to the surface of the film and (F-2) is an X-ray diffraction intensity on a plane (100) parallel to the surface of the film; and (4) the polyester film has a static friction coefficient of 0.3 to 0.6.

The base film for receiving an ink jet printer image of the present invention is excellent in adhesion, glossiness, opacifying properties and transportability.

21 Claims, No Drawings

US 6,896,941 B1

POLYESTER FILM FOR USE AS AN INK IMAGE RECEIVING BASE FILM AND INK

DETAILED DESCRIPTION OF THE INVENTION

1. Field of the Invention

The present invention relates to a white biaxially oriented polyester film. More specifically, it relates to a white biaxially oriented polyester film for use as a base film for receiving an ink jet printer image, which is excellent in adhesion, gloss, opacifying properties and transportability.

2. Prior Art

Polyester films typified by a polyethylene terephthalate film have been widely used as an image receiving base film. With increasing demand for color printers, new printing system such as ink jet system has been developed. An ink image receiving layer must be formed on the image receiving base film of this printing system as proposed by JP-A64-36479 and JP-A1-95091 (the term "JP-A" as used herein means an "unexamined published Japanese patent application"). This ink image receiving layer is made from a porous material having excellent ink absorption properties. However, it has poor adhesion to a polyester film used as a base film.

With growing demand for image receiving base films, demand for glossy white films is increasing. It is well known that a white polyester film is obtained by adding a large amount of white inorganic particles such as titanium oxide or calcium carbonate to a polyester. It is also known that a low-density white polyester film is obtained by adding a polyolefin such as polypropylene to a polyester. However, since an olefin is exposed in this film containing a polyolefin, there arise such problems as poor printability, low productivity caused by dirty rolls and low gloss. To prevent these problems, methods of producing a laminate film have been proposed (JP-A 7-157581, JP-A 2-26739, etc.). However, when an olefin is added and the obtained white film is bent, wrinkles formed by bending become marked, making the film unsightly.

Problems to be Solved by the Invention

It is a first object of the present invention to provide a white polyester film which has a high gloss and excellent opacifying properties and transportability, is free from bending wrinkles and is suitable for use as a base film for receiving an ink jet printer image.

It is a second object of the present invention to provide an adhesive polyester film which has excellent adhesion to an ink image receiving layer, has opacifying, properties and is suitable for use as a base film for receiving an ink jet printer image.

Means for Solving the Problems

According to studies conducted by the present inventors, it has been found that the above objects of the present invention are attained by the following (I) white biaxially oriented polyester film for use as a base film for receiving an ink jet printer image and (II) white biaxially oriented polyester laminate film for use as a base film for receiving an ink jet printer image.

(I) the white biaxially oriented polyester film for use as a base film for receiving an ink jet printer image which satisfies the following requirements (1) to (4).
(1) The content of titanium oxide particles having an average particle diameter of 0.1 to 0.5 μm in the polyester film is 5 to 20 wt %.
(2) The polyester film has an average glossiness of 65 to 95%.
(3) The polyester film has an X-ray diffraction intensity ratio (F-1/F-2) represented by the following expression (1):

$$0.05 \leq (F\text{-}1/F\text{-}2) \leq 0.15 \qquad (1)$$

wherein (F-1) is an X-ray diffraction intensity on a plane ($1\bar{1}0$) parallel to the surface of the film and (F-2) is an X-ray diffraction intensity on a plane (100) parallel to the surface of the film.
(4) The polyester film has a static friction coefficient of 0.3 to 0.6.
(II) the white biaxially oriented polyester laminate film for use as a base film for receiving an ink jet printer image which comprises a coating film layer substantially made of the following components (A) to (C) on at least one side of the white biaxially oriented polyester film of the above paragraph (I).
(A) 50 to 80 wt % of a copolyester having a secondary transition point of 20 to 90° C.
(B) 10 to 30 wt % of a water-soluble polymer compound.
(C) 3 to 25 wt % of fine particles having an average particle diameter of 20 to 80 nm.

The present invention will be described in detail hereinafter.

The polyester constituting the polyester film of the present invention is a polyester obtained by polycondensing a diol and a dicarboxylic acid. Typical examples of the dicarboxylic acid include terephthalic acid, isophthalic acid, 2,6-naphthalenedicarboxylic acid, 4,4'-diphenyldicarboxylic acid, adipic acid, sebacic acid and the like. Typical examples of the diol include ethylene glycol, 1,4-butanediol, 1,4-cyclohexanedimethanol, 1,6-hexanediol and the like. Polyethylene terephthalate and polyethylene-2,6-naphthalene dicarboxylate are preferred, and polyethylene terephthalate is particularly preferred. These aromatic polyesters may be a homopolymer or copolymer. In the case of a copolymer, a copolymerizable component is a diol component such as diethylene glycol, neopentyl glycol or polyalkylene glycol, or a dicarboxylic acid component such as adipic acid, sebacic acid, phthalic acid, isophthalic acid, 2,7-naphthalenedicarboxylic acid or 5-sodium sulfoisophthalic acid. The copolymerizable component is used in an amount of 15 mol % or less, preferably 10 mol % or less based on the total of all the dicarboxylic acid components.

In the present invention, a white film is obtained by containing titanium oxide particles In a polyester film. The titanium oxide particles used have an average particle diameter of 0.1 to 0.5 μm, preferably 0.1 to 0.4 μm and are added in an amount of 5 to 20 wt %, preferably 6 to 15 wt %. When the average particle diameter is smaller than 0.1 μm, they agglomerate due to extremely low dispersibility, causing troubles in production process and forming coarse projections on the film. As a result, the obtained film may be inferior in gloss. When the average particle diameter is larger than 0.5 μm, the surface of the film becomes rough with the result of a low gloss. When the amount is smaller than 5 wt %, the obtained film has poor opacifying properties. Therefore, a good product cannot be obtained. When the amount is larger than 20 wt %, the stretchability of the film lowers with the result of a drastic reduction in production efficiency.

Inert particles other than titanium oxide particles can be added to the polyester film of the present invention to improve transportability.

The inert particles other than titanium oxide have an average particle diameter of 0.01 to 5.0 μm and are used in an amount of 0.01 to 0.5 wt %. The inert particles may be either inorganic particles or organic particles. Inorganic particles include silica, alumina, calcium carbonate, barium sulfate and the like. Organic particles include silicone particles and the like. Out of these, silica particles are preferred. When the average particle diameter of the inert particles is smaller than 0.01 µm, transportability cannot be further improved and when the average particle diameter is larger than 5.0 µm, glossiness lowers.

The titanium oxide particles and the inert particles other than titanium oxide are surface treated with a fatty acid such as stearic acid or a derivative thereof (surface treating agent) to improve dispersibility. The treatment of titanium oxide particles for improving dispersibility is particularly preferred because the glossiness of the film is improved. Before the titanium oxide particles and the other inert particles are contained in the polyester, it is preferred to carry out the control of particle size or a purification process such as the removal of coarse particles. The industrial means of the purification process include milling means such as a jet mill and ball mill and classification means such as dry and wet centrifugal separators. It is needless to say that these means may be used in combination of two or more or used in different stages. To contain these particles in the polyester, various methods may be used. Typical methods (a) to (c) are given below.

(a) The particles are added before the end of an ester exchange reaction or an esterification reaction for the synthesis of a polyester or before the start of a polycondensation reaction.

(b) The particles are added to a polyester, molten and kneaded.

(c) A master pellet is produced by adding large amounts of titanium oxide particles and other inert particles in the above methods (a) and (b), and kneaded with a polyester which does not contain these particles such that these particles are contained in a predetermined amount. When the method (a) in which the particles are added at the time of synthesizing a polyester is used, it is preferred to add a slurry prepared by dispersing the titanium oxide particles and the other inert particles in glycol.

The biaxially oriented polyester film of the present invention can be obtained by producing an aromatic polyester containing titanium oxide particles or mixed particles consisting of titanium oxide particles and other inert particles in accordance with the above method, stretching by film formation means which will be described hereinafter and heating. The film forming means and conditions will be described hereinafter. A description is first given of the physical properties of the biaxially oriented polyester film of the present invention.

The biaxially oriented polyester film of the present invention has an average glossiness of 65.0 to 95.0%, preferably 70 to 90%. When the average glossiness is lower than 65%, the biaxially oriented polyester film has a low gloss and is not suitable for use as a base film for receiving an ink jet printer image. When the average glossiness is higher than 95%, glossiness is fully satisfactory but the surface of the film becomes too flat, whereby a film having poor transportability is obtained.

The biaxially oriented polyester film of the present invention has a thickness of 50 to 250 µm, preferably 60 to 220 µm.

The biaxially oriented polyester film of the present invention has an X-ray diffraction intensity ratio (F-1/F-2) represented by the following expression (1):

$$0.05 \leq (F\text{-}1/F\text{-}2) \leq 0.15 \quad (1)$$

wherein (F-1) is an X-ray diffraction intensity on a plane (1$\bar{1}$0) parallel to the surface of the film and (F-2) is an X-ray diffraction intensity on a plane (100) parallel to the surface of the film.

The above X-ray diffraction intensity ratio (F-1/F-2) is in the range of 0.05 to 0.15, preferably 0.07 to 0.12. The X-ray diffraction intensity ratio can be set to the above range by selecting stretching temperatures and draw ratios in longitudinal and transverse directions in the step of film formation from ranges which will be given hereinafter. When the X-ray diffraction intensity ratio is smaller than 0.05, film formation stability lowers and when the X-ray diffraction intensity ratio is larger than 0.15, the average glossiness of the film lowers.

The biaxially oriented polyester film of the present invention has a static friction coefficient of 0.3 to 0.6, preferably 0.31 to 0.57. The static friction coefficient of the film can be set to the above range by blending the above titanium oxide particles and other inert particles into the polyester in the above amounts. When the static friction coefficient of the film is smaller than 0.3, the glossiness of the film lowers and when the static friction coefficient is larger than 0.6, the transportability of the film worsens.

The biaxially oriented polyester film of the present invention has a small thermal shrinkage factor of 2% or less, preferably 1% or less when it is heated at 150° C. for 30 minutes. When the thermal shrinkage factor is larger than 2%, the obtained film is not suitable for use as a base film for receiving an ink jet printer image.

Further, it is desired that the biaxially oriented polyester film of the present invention should have a center line average surface roughness (Ra) of 30 to 100 nm, preferably 35 to 80 nm.

In the present invention whose object is to provide a film having a high average glossiness, the average glossiness depends on the molecular orientation of the film in addition to the amounts of the above titanium oxide and other inert particles and the type of the other inert particles. Stated specifically, the molecular orientation rate (MOR) is in the range of 1.1 to 4.0, preferably 1.2 to 3.8. The molecular orientation (MOR) rate can be set to the above range by selecting stretching conditions which will be described hereinafter, particularly draw rations in longitudinal and transverse directions. Although the relationship between orientation and average glossiness is unknown, it is assumed that the formation of projections by a lubricant added to the film is suppressed by high orientation with the result of a reduction in the surface roughness of the film and an increase in the average glossiness of the base film. A film having an MOR of less than 1.1 has a low average glossiness and large thickness nonuniformity due to low orientation. Therefore, the film is not preferred as a product. A film having an MOR of more than 4.0 has high orientation, thereby deteriorating film formation stability and productivity.

Since the biaxially oriented polyester film of the present invention is used as a base film for receiving an ink jet printer image, it is white and has the above range of average glossiness and an optical density of preferably 0.7 to 1.6. The optical density can be set to the above range by selecting the concentration of titanium oxide particles added. When the optical density is lower than 0.7, the opacifying properties become insufficient and the rear side can be seen disadvantageously. To produce a film having an optical density of more than 1.6, the concentration of titanium oxide particles added must be made higher than necessary, whereby the strength of the film may become low or it may be difficult to form a film.

As described above, the film of the present invention is white and the degree of its whiteness satisfies the following expressions (1) to (3) when lightness defined in CIE 1976 is represented by L* and chroma is represented by C*.

$$L^* \geq 90 \quad (1)$$

$$C^* \geq 3 \quad (2)$$

$$2L^*+C^* \geq 190 \quad (3)$$

(with a proviso that $C^*=\{(a^*)^2+(b^*)^2\}^{1/2}$).

When lightness (L*) and chroma (C*) do not satisfy any one of the above expressions (1) to (3), the chroma of the film becomes dark, whereby the film is not suitable for use as a base film for receiving an ink jet printer image. To obtain a film having lightness (L*) and chroma (C*) which satisfy the above expressions (1) to (3), the average particle diameter and the concentration of the titanium oxide particles are set to the above ranges, or additives for improving the color of the film are added. For example, the addition of a fluorescent brightener is effective in adjusting the b* value.

According to the present invention, there are provided the above biaxially oriented polyester film and further a white biaxially oriented polyester laminate film (may be simply referred to as "laminate film" hereinafter) for use as a base film for receiving an ink jet printer image which comprises a coating film layer substantially made of the following components (A) to (C) and formed on at least one side of the above film:

(A) 50 to 80 wt % of a copolyester having a secondary transition point of 20 to 90° C., (B) 10 to 30 wt % of a water-soluble polymer compound, and (C) 3 to 25 wt % of fine particles having an average particle diameter of 20 to 80 nm.

The coating film layer formed on the surface of the polyester is substantially made of the above components (A) to (C) and has a thickness of 0.02 to 1 μm, preferably 0.03 to 0.8 μm.

The coating film layer has a surface energy of 50 to 70 mN/m, preferably 54 to 70 mN/m, and most preferably 55 to 67 mN/m.

A description is subsequently given of the components of the coating film layer formed on the surface of the laminate film.

The copolyester (A) of the coating film layer has a secondary transition point (Tg) of 20 to 90° C., preferably 25 to 80° C. When Tg is lower than 20° C. the blocking of the laminate film readily occurs and when Tg is higher than 90° C. the chipping resistance and adhesion of the film lower disadvantageously.

The copolyester (A) is contained in the coating film layer in an amount of 50 to 80 wt %, preferably 55 to 75 wt % based on the composition forming the layer.

The copolyester (A) is preferably a copolyester comprising a dicarboxylic acid component having a sulfonate group in an amount of 1 to 16 mol %, preferably 1.4 to 14 mol % based on the total of all the dicarboxylic acid components forming the copolyester.

When the amount of the dicarboxylic acid component having a sulfonate group is smaller than 1 mol % based on the total of all the dicarboxylic acid components forming the copolyester (A), the hydrophilic nature of the copolyester becomes insufficient and when the amount is larger than 16 mol %, the humidity resistance of the coating film layer lowers disadvantageously.

The copolyester (A) is a polyester which comprises a carboxylic acid component such as terephthalic acid, isophthalic acid, 2,6-naphthalenedicarboxylic acid, hexahydroterephthalic acid, 4,4'-diphenyldicarboxylic acid, phenylindanedicarboxylic acid, adipic acid, sebacic acid, 5-sulfoisophthalic acid, trimellitic acid or dimethylolpropionic acid, a dicarboxylic acid component having a sulfonate group such as 5-Na sulfoisophthalic acid, 5-K sulfoisophthalic acid or 5-K sulfoterephthalic acid, and a hydroxy compound component such as ethylene glycol, diethylene glycol, neopentylene glycol, 1,4-butanediol, 1,6-hexanediol, 1,4-cyclohexanedimethanol, glycerin, trimethylolpropane or bisphenol A adduct with alkylene oxide and is used as an aqueous solution, water dispersion or emulsion.

The water-soluble polymer compound (B) in the coating film layer is contained in an amount of 10 to 30 wt %, preferably 12 to 25 wt % based on the composition forming the layer. At least one selected from the group consisting of a polyvinyl alcohol, polyvinyl pyrrolidone and polyethylene glycol is used as the water-soluble polymer compound (B).

The polyvinyl alcohol as the component (B) preferably has a saponification degree of 75 to 95 mol %. When the saponification degree is lower than 75 mol %, the humidity resistance of the coating film lowers and when the saponification degree is higher than 95 mol %, the adhesion of the coating film to an ink image receiving layer deteriorates disadvantageously. Further, the polyvinyl alcohol is preferably a cation modified polyvinyl alcohol having a saponification degree of 74 to 91 mol % because the adhesion of the resulting coating film to the ink image receiving layer becomes excellent. The polyvinyl pyrrolidone has an K value of 26 to 100. When the K value is smaller than 26, the strength of the coating film becomes low disadvantageously. When the K value is larger than 100, the adhesion of the coating film to the ink image receiving layer deteriorates disadvantageously.

The polyvinyl pyrrolidone preferably has an average molecular weight of 40,000 or more because the chipping resistance of the coating film of the coating film layer becomes excellent.

Copolyethylene glycol obtained by copolymerizing a small amount of propylene glycol in addition to water-soluble polyethylene glycol is used as the polyethylene glycol as the component (B).

Out of the above water-soluble polymer compounds (B), the polyvinyl alcohol and polyethylene glycol having a saponification degree of 75 to 95 mol %, the cation modified polyvinyl alcohol having a saponification degree of 74 to 91 mol % and the polyvinyl pyrrolidone having a K value of 26 to 100 are preferred.

The fine particles (C) contained in the coating film layer have an average particle diameter of 20 to 80 nm, preferably 25 to 70 nm. When the average particle diameter of the fine particles (C) is smaller than 20 nm, the blocking of the obtained laminate film readily occurs and when the average particle diameter is larger than 80 nm, the chipping resistance of the laminate film deteriorates.

The fine particles (C) are contained in an amount of 3 to 25 wt %, preferably 5 to 20 wt % based on the composition forming the coating film layer.

The fine particles (C) are organic or inorganic fine particles, as exemplified by calcium carbonate, calcium oxide, aluminum oxide, kaolin, silicon oxide, zinc oxide, crosslinked acrylic resin particles, crosslinked polystyrene particles, melamine resin particles and crosslinked silicone resin particles.

The coating film layer of the present invention is substantially formed from the copolyester (A), the water-soluble polymer compound (B) and the fine particles (C) or from a crosslinked composition comprising the above components (A), (B) and (C) and further a polyfunctional epoxy compound (D).

The adhesion of the coating film layer to the film and further the adhesion of the coating film layer to an ink image receiving layer after printing by means of an ink jet printer are improved by blending and crosslinking this polyfunctional epoxy compound (D).

When the polyfunctional epoxy compound (D) is blended, the amount of the compound (D) is 5 to 20 wt %, preferably 7 to 15 wt % based on the composition of the coating film layer.

The polyfunctional epoxy compound (D) is preferably a compound containing 4 epoxy groups represented by the following formula:

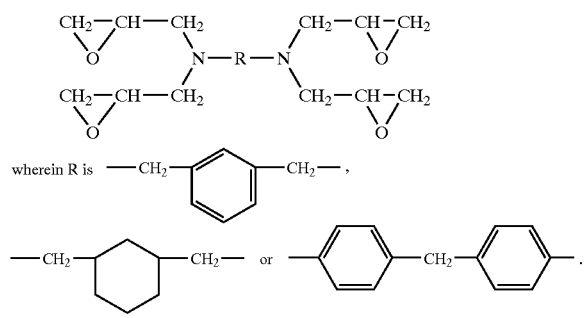

Another resin such as a melamine resin, antistatic agent, colorant, surfactant and ultraviolet light absorber may be contained in the composition forming the coating film layer in small amounts, in addition to the above components.

A description is subsequently given of the method of forming the white biaxially oriented polyester film of the present invention and the method of forming a coating film layer on the biaxially oriented polyester film.

The polyester film of the present invention can be produced by preparing a polyester composition containing titanium oxide particles and forming a film from the composition by known film forming means per se such as a tenter or inflation method.

Film formation by the tenter method is preferred and the means of film formation is sequential biaxial orientation or simultaneous biaxial orientation. Specifically, sequential biaxial orientation will be described in detail hereinafter. A polyester composition is first dried, molten at a temperature higher than its melting point, extruded from a slit die onto a cooled drum and quenched to produce an unstretched sheet. This unstretched sheet is heated by rolls or infrared radiation and stretched in a longitudinal direction to obtain a longitudinally stretched film. Longitudinal stretching is preferably carried out making use of the difference of rotation speed between two or more rolls. The longitudinal stretching temperature is preferably higher than the glass transition point (Tg) of the polyester, more preferably 20 to 40° C. higher than Tg. The draw ratio, which depends on requirements from application, is preferably 2.5 times or more and 4.0 times or less, more preferably 2.8 times or more and 3.9 times or less. When the draw ratio is smaller than 2.5 times, the thickness nonuniformity of the film increases, thereby making it impossible to obtain a satisfactory film. When the draw ratio is larger than 4.0 times, the rupture of the film readily occurs during film formation. The longitudinally stretched film is subsequently stretched in a transverse direction and heat set and optionally thermally relaxed to obtain a biaxially oriented film. These treatments are carried out on line while the film is caused to run.

Transverse stretching is first carried out at a temperature 20° C. higher than the glass transition point (Tg) of the polyester and then by increasing the temperature to a temperature (120 to 30)° C. lower than the melting point (Tm) of the polyester. The stretching start temperature is preferably (Tg+40)° C. or less. The maximum stretching temperature is preferably a temperature (100 to 40)° C. lower than Tm. Increasing the temperature in the step of stretching the film in a transverse direction may be carried out continuously or stepwise (sequentially). Generally speaking, the temperature is increased sequentially. For example, the transverse stretching zone of the tenter is divided into a plurality of sections in the running direction of the film and a heating medium having a predetermined temperature is caused to flow into each zone to increase the temperature. When the transverse stretching start temperature is too low, the rupture of the film occurs disadvantageously. When the maximum stretching temperature is lower than (Tm−120)° C., the thermal shrinkage of the film becomes large and uniformity in the physical properties of the film in a width direction lowers disadvantageously. When the maximum stretching temperature is higher than (Tm−30)° C., the film becomes soft and ruptures by disturbance or the like disadvantageously. The transverse draw ratio is preferably 2.5 times or more and 4.0 times or less, more preferably 2.8 times or more and 3.9 times or less. Below 2.5 times, nonuniformity in the thickness of the film increases, thereby making it impossible to obtain a satisfactory film. Above 4.0 times, the rupture of the film readily occurs during film formation.

In the present invention, the coating film layer made of the above components is formed on at least one side of the white polyester film. For example, an aqueous solution containing components for forming the coating film layer is applied to a stretchable polyester film, dried and stretched and optionally heated to form a coating film layer on the polyester film. The solid content of the aqueous solution is generally 30 wt % or less, preferably 10 wt % or less. The above stretchable polyester film is an unstretched polyester film, uniaxially stretched polyester film or biaxially oriented polyester film. Out of these, a uniaxially stretched polyester film which is stretched in an extrusion (longitudinal) direction of the film is particularly preferred. When an aqueous solution is to be applied to the polyester film, it is not preferred to carry out a general coating step, that is, apply the aqueous solution to the biaxially oriented heat set polyester film, separate from the film production step, because dust and the like are easily contained in the film. Coating in a clean atmosphere, that is, coating in the film production step is preferred from the above point of view. The adhesion of the coating film to the polyester film is further improved by this coating. Any known coating method can be employed. For example, roll coating, gravure coating, roll brushing, spray coating, air knife coating, impregnation and curtain coating may be used alone or in combination. The amount of coating is 0.5 to 20 g, preferably 1 to 10 g per 1 m² of the running film. The aqueous solution is preferably a water dispersion or emulsion.

Specific examples (a) to (d) of the laminate film of the present invention are given below. In the following description, the expression white polyester film means a biaxially oriented film.

(a) A polyester laminate film for use as a base film for receiving an ink image, wherein a coating film layer is formed on at least one side of the white polyester film, the coating film layer substantially comprising (A) 50 to 80 wt % of a copolyester having a secondary transition point of 20 to 90° C. and containing a dicarboxylic acid component having a sulfonate group in an amount of 1 to 16 mol % based on the total of all the dicarboxylic acid components forming the copolyester, (B) 10 to 30 wt % of a water-soluble polymer compound and (C) 3 to 25 wt % of fine particles having an average particle diameter of 20 to 80 nm, and having a surface energy of 54 to 70 mN/m.

(b) A polyester laminate film for use as a base film for receiving an ink image, wherein a coating film layer is formed on at least one side of the white polyester film, the coating film layer substantially comprising (A) 30 to 80 wt % of an aqueous binder, (B) 10 to 40 wt % of a water-soluble polymer, (C) 3 to 25 wt % of fine particles having an average particle diameter of 20 to 80 nm and (D) 5 to 20 wt % of a polyfunctional epoxy compound crosslinking agent as essential ingredients and having a surface energy of 50 to 70 mN/m.

(c) A white polyester laminate film for use as a base film for receiving an ink image, comprising a polyester film which (A) a copolyester, (B) polyethylene glycol and (C) a coating layer formed on fine particles as essential ingredients are formed on at least one side of the white polyester film, the polyester film containing 5 to 20 wt % of titanium oxide having an average particle diameter of 0.1 to 0.2 $\mu$m and 0.01 to 0.5 wt % of inert particles other than titanium oxide having an average particle diameter of 0.01 to 5.0 $\mu$m and having an average glossiness of 80.5 to 95% and a static friction coefficient of 0.30 to 0.50.

(d) A white polyester laminate film comprising a polyester film which (A) a copolyester, (B) polyethylene glycol and (C) a coating layer formed on fine particles as essential ingredients are formed on at least one side of the white polyester film, the polyester film containing 5 to 20 wt % of titanium oxide having an average particle diameter of 0.2 to 0.5 $\mu$m and 0.01 to 0.5 wt % of inert particles other than titanium oxide having an average particle diameter of 0.01 to 5.0 $\mu$m, and having an average glossiness of 65 to 80% and an X-ray diffraction intensity ratio (F-1/F-2) which satisfies the following expression (1):

$$0.05 \leq (F\text{-}1/F\text{-}2) \leq 0.15 \quad (1)$$

wherein (F-1) is an X-ray diffraction intensity on a plane ($1\bar{1}0$) parallel to the surface of the film and (F-2) is an X-ray diffraction intensity on a plane (100) parallel to the surface of the film.

Effects of the Invention

According to the present invention, there can be provided a white polyester film useful as a base film for receiving an ink jet printer image which has a high gloss and excellent opacifying properties and transportability and is free from bending wrinkles.

EXAMPLES

The following examples are provided for the purpose of further illustrating the present invention but are in no way to be taken as limiting. The characteristic properties of the film were measured in accordance with the following methods.

(1) Secondary Transition Point

This is measured with the Thermal Analyst 2000 differential calorimeter of DuPont Co., Ltd. at a temperature increasing rate of 20° C./min.

(2) Intrinsic Viscosity

This is measured for viscosity of a solution in an orthochlorophenol solvent at 35° C.

(3)-(a) Adhesion Before Printing

An aqueous slurry prepared by mixing 70 wt % of spherical silica (average particle diameter of 18 $\mu$m, average pore diameter of 200 Å, average pore volume of 1.5 cc/g) and 30 wt % of a polyvinyl alcohol (PVA117 of Kuraray Co., Ltd.) is applied to the coating film surface of a polyester film to a dry thickness of 20 $\mu$m, and Scotch tape (No. 600 of 3M Limited) having a width of 12.7 mm and a length of 150 mm is affixed to the coating film such that air bubbles are not contained therein, bonded to the coating film by rolling with a manual roll specified in JIS.C2107 (1975) and cut to the width of the tape. By removing the Scotch tape from the thus prepared sample, the peeling of the ink image receiving layer from the polyester film is observed to evaluate adhesion as follows.

A: Peeling is not observed at all and adhesion is excellent.
B: The peeling of a foreign matter portion is slightly observed.
C: Peeling is markedly observed.

(3)-(b) Adhesion After Printing

An aqueous slurry prepared by mixing 70 wt % of spherical silica (average particle diameter of 18 $\mu$m, average pore diameter of 200 Å, average pore volume of 1.5 cc/g) and 30 wt % of a polyvinyl alcohol (PVA117 of Kuraray Co., Ltd.) is applied to the coating film surface of a polyester film to a dry thickness of 20 $\mu$m and printed with a PC image as input data taken by a digital camera or the like by an ink jet printer (PM-750C of Epson Co., Ltd.), and Scotch tape (No. 600 of 3M Limited) having a width of 12.7 mm and a length of 150 mm is affixed to this printed coating film such that air bubbles are not contained therein, bonded to the coating film by rolling with a manual roll specified in JIS.C2701 (1975) and cut to the width of the tape. By removing the Scotch tape from the thus prepared sample, the peeling of the ink image receiving layer from the polyester film is observed to evaluate adhesion as follows.

A: Peeling is not observed at all and adhesion is excellent
B: The peeling of a foreign matter portion is slightly observed.
C: Peeling is markedly observed (4) Friction Coefficient The front side and rear side of the film are joined together and a load of 1 kg is applied to the film to measure the static friction coefficient of the film with the slip measuring instrument of Toyo Tester Co., Ltd. in accordance with ASTM.D1894-63. When the friction coefficient is larger than 0.6, the transportability of the film becomes unsatisfactory.

(5) Antiblock Properties

Two films cut to a width of 50 mm are placed one upon the other and treated under a load of 50 kg/cm$^2$ at a temperature of 40° C. and a relative humidity of 50% for 17 hours to measure the peel strength (g/50 mm) of a loaded portion with a tensile tester. The peel strength is evaluated as follows.

peel strength $\leq$ 10 g/50 mm: excellent
10 g/50 mm < peel strength $\leq$ 30 g/50 mm: good
30 g/50 mm < peel strength: poor (6) Surface Energy The critical surface tension γc measured in accordance with W. A. Zisman: "Contact Augle, Wettability and Adhesion", Am. Chem. Soc., (1964) is taken as surface energy.

(7) Water Dispersibility

A coating agent is diluted with water to prepare a 0.2 wt % water dispersion so as to measure the light transmittance of the water dispersion by the double-beam spectrophotometer (Model 228A) of Hitachi, Ltd. using a quartz cell. The water dispersibility of the coating agent is evaluated from the measurement result as follows.

transmittance≧50%: excellent

50%>transmittance≧30%: good

30%>transmittance: poor (8) Humidity Resistance

Peel strength (g/50mm) is measured in the same manner as evaluation for the evaluation of antiblock properties except that the treatment conditions are changed to 60° C.×70% RH×17 hours. Humidity resistance is evaluated from the measurement result as follows.

peel strength≦10 g/50 mm: excellent 10 g/50 mm<peel strength≦30 g/50 mm: good 30 g/50 mm≦peel strength: poor (9) Average Glossiness (Gs)

This is measured with the GM-3D glossimeter of Murakami Shikisai Gijutsu Kenkyusho in accordance with JIS Z 8741-1962. The measurement angle is 60°, the number n of times of measurement is 5, and the means value of measurement data is taken as average glossiness (Gs).

(10) Light Transmittance

This is measured with the HR-100 haze meter of Murakami Shikisai Giljutsu Kenkyusho in accordance with ASTM-D1003.

(11) Thermal Shrinkage Factor

The shrinkage factor of a polyester film after it is heated at 150° C. for 30 minutes is measured at a distance between gage marks of 30 cm.

(12) Center Line Average Roughness (Ra)

When a chart is drawn by the SE-3FAT high-precision surface roughness meter of Kosaka Kenkyusho Co., Ltd. in accordance with JIS B0601 at a needle radius of 2 μm, a load of 30 mg, a magnification of 50,000× and a cut-off of 0.08 mm, a measurement length L portion is extracted from the surface roughness curve in a center line direction, and the center line of the extracted portion is plotted as an X axis and the direction of the longitudinal draw ratio is plotted as a Y axis to express the roughness curve by Y=f(x), a value given by the following expression is expressed in unit of nm.

$$Ra = \frac{1}{L}\int_0^L |f(x)|dx$$

This measurement is made 4 times at a standard length of 1.25 mm and the mean value of the measurement data is taken as center line average roughness.

(13) Sharpness

An image taken by a digital camera or the like is input into a personal computer and printed on a polyester film having an ink image receiving layer by an ink jet printer (PM-750C of Epson Co., Ltd.) to observe the clearness of the printed matter by the eye and evaluated as follows.

A: printed image is very clear . . . excellent

B: printed image is clear . . . good

C: printed image is unclear . . . poor

(14) Molecular Orientation Rate (MOR)

The plot of an oriented oval is obtained using the MOA-2001A molecular orientation meter of Oji Paper Co., Ltd. and the ratio of long axis to short axis calculated based on this plot is taken as molecular orientation rate (MOR).

(15) Transportability 100 films are piled up on the paper feed tray of the PM-700C ink jet printer of Epson Co., Ltd. and printed in a continuous paper feed mode to judge the transportability of the films based on the following criteria.

○: 2 or less films fail to be fed and carried

Δ: 3 to 5 films fail to be fed and carried

×: more than 5 films fail to be fed and carried

(16) Opacifying Properties

A 5 mm wide and 5 cm long line is drawn on one side of the film with a black oil magic marker and observed from the other side of the film to judge the opacifying properties of the film based on the following criteria.

○: black line cannot be seen at all.

Δ: black line is slightly seen.

×: black line can be seen clearly.

(17) X-ray Diffraction Intensity Ratio

The ratio (f(100)/f(1-10)) of X-ray diffraction intensity (f(100)) on a plane (100) parallel to the surface of the film to X-ray diffraction intensity (f(1-10)) on a plane (1-10) parallel to the surface of the film is measured by a multiplex peel separation method using a Pseudo Voight peel model using CuK-α as an X-ray source, at a divergent slit of ½°, a diffusion slit of ½°, a receiving slit of 0.15 mm and a scanning speed of 1,000°/min. The area of the diffraction peak of each crystal plane is obtained and taken as X-ray diffraction intensity. A reflection peak derived from a pigment such as titanium oxide is located near f(100) and the area is obtained by excluding this.

(18) Optical Density

Films are piled up to a thickness of about 100 μm and measured with an optical densimeter (X-Rite 310TR). Thickness and optical density are plotted to obtain optical density when the thickness of the laminate is 100 μm.

(19) L*/a*/b* Values

A film is placed on a white standard plate having three stimulus values, Y=94.95, X=93.63 and Z=112.32 and measured with the SZ-Σ90 color difference meter of Nippon Denshoko Kogyo Co., Ltd. The L* value, a* value and b* value are based on L*/a*/b* color specification system defined by CIE1976.

Example I and Comparative Example I

Anatase titanium oxide particles and other inert particles shown in Table 1 were added to polyethylene terephthalate, melt extruded at 280° C. and solidified by cooling to obtain an unstretched film. This unstretched film was stretched in a longitudinal direction and then a transverse direction under conditions shown in Table 1 and heat set to obtain a 100 μm thick white film. Right after stretching in the longitudinal direction, the white film was coated with an aqueous solution composed of 65 wt % of a copolyester (Tg=30° C.) consisting of terephthalic acid (60 mol %), isophthalic acid (37 mol %) and 5-Na sulfoisophthalic acid (3 mol %) as acid components and ethylene glycol (40 mol %), neopentyl glycol (40 mol %) and bisphenol A adduct with ethylene oxide (20 mol %) as glycol components, 16 wt % of polyethylene oxide having a molecular weight of 1,000, 10 wt % of crosslinked acrylic resin particles having an average particle diameter of 40 nm and 9 wt % of polyoxyethylene nonylphenyl ether, and having a solid content of 4 wt % by a roll coater. The characteristic properties of this laminate film are shown in Table 1.

TABLE 1

|  | titanium oxide | | lubricant (second component) | | | | | |
|---|---|---|---|---|---|---|---|---|
|  | particle diameter μm | amount wt % | type | particle diameter μm | amount wt % | static fraction coefficient | average glossiness | Ra nm |
| Ex. I-(1) | 0.15 | 10 | silica | 0.03 | 0.05 | 0.40 | 88 | 41 |
| Ex. I-(2) | 0.15 | 20 | silica | 0.03 | 0.05 | 0.35 | 82 | 44 |
| Ex. I-(3) | 0.15 | 10 | silica | 0.03 | 0.05 | 0.38 | 92 | 38 |
| Ex. I-(4) | 0.15 | 10 | silica | 0.03 | 0.05 | 0.44 | 83 | 44 |
| Ex. I-(5) | 0.15 | 5 | silica | 1.50 | 0.50 | 0.31 | 81 | 46 |
| C. Ex. I-(1) | 0.30 | 20 | silica | 0.03 | 0.05 | 0.38 | 60 | 68 |
| C. Ex. I-(2) | 0.15 | 10 | none | — | — | 0.62 | 93 | 32 |
| C. Ex. I-(3) | 0.15 | 10 | silica | 5.50 | 0.01 | 0.29 | 63 | 66 |
| C. Ex. I-(4) | 0.15 | 3 | silica | 4.00 | 0.30 | 0.33 | 81 | 53 |
| C. Ex. I-(5) | 0.15 | 10 | silica | 0.03 | 0.05 | 0.40 | 79 | 48 |

|  | longitudinal stretching conditions | | transverse stretching conditions | | | | |
|---|---|---|---|---|---|---|---|
|  | temperature °C. | draw ratio | temperature °C. | draw ratio | MOR | opacifying properties | transport-ability |
| Ex. I-(1) | 100 | 3.0 | 120 | 3.3 | 2.5 | ○ | ○ |
| Ex. I-(2) | 100 | 3.0 | 120 | 3.3 | 2.5 | ○ | ○ |
| Ex. I-(3) | 110 | 3.0 | 120 | 3.5 | 3.8 | ○ | ○ |
| Ex. I-(4) | 110 | 3.0 | 120 | 3.1 | 1.2 | ○ | ○ |
| Ex. I-(5) | 100 | 3.0 | 120 | 3.3 | 2.5 | ○ | ○ |
| C. Ex. I-(1) | 100 | 3.0 | 120 | 3.3 | 2.5 | ○ | ○ |
| C. Ex. I-(2) | 100 | 3.0 | 120 | 3.3 | 2.5 | ○ | × |
| C. Ex. I-(3) | 100 | 3.0 | 120 | 3.3 | 2.5 | ○ | ○ |
| C. Ex. I-(4) | 100 | 3.0 | 120 | 3.3 | 2.5 | Δ | ○ |
| C. Ex. I-(5) | 110 | 3.0 | 120 | 3.0 | 1.0 | ○ | ○ |

Ex.: Example
C. Ex.: Comparative Example

Example II and Comparative Example II

Anatase titanium oxide particles shown in Table 2 were added to polyethylene terephthalate, melt extruded at 280° C. and solidified by cooling to obtain an unstretched film. This unstretched film was stretched in a longitudinal direction and then a transverse direction under conditions shown in Table 2 and heat set to obtain a 100 μm thick white film. Right after stretching in the longitudinal direction, the white film was coated with an aqueous solution composed of 65 wt % of a copolyester (Tg=30° C.) consisting of terephthalic acid (60 mol %), isophthalic acid (37 mol %) and 5-Na sulfoisophthalic acid (3 mol %) as acid components and ethylene glycol (40 mol %), neopentyl glycol (40 mol %) and bisphenol A adduct with ethylene oxide (20 mol %) as glycol components, 16 wt % of polyethylene oxide having a molecular weight of 1,000, 10 wt % of crosslinked acrylic resin particles having an average particle diameter of 40 nm and 9 wt % of polyoxyethylene nonylphenyl ether, and having a solid content of 4 wt % by a roll coater. The characteristic properties of this laminate film are shown in Table 2.

TABLE 2

|  | titanium oxide | | longitudinal stretching conditions | | transverse stretching conditions | |
|---|---|---|---|---|---|---|
|  | particle diameter μm | amount wt % | temperature °C. | draw ratio | temperature °C. | draw ratio |
| Ex. II-(1) | 0.3 | 12 | 100 | 3.0 | 120 | 3.3 |
| Ex. II-(2) | 0.4 | 20 | 100 | 3.0 | 120 | 3.3 |
| Ex. II-(3) | 0.3 | 12 | 110 | 3.0 | 120 | 3.5 |
| Ex. II-(4) | 0.3 | 12 | 110 | 3.0 | 120 | 3.1 |
| Ex. II-(5) | 0.4 | 5 | 100 | 3.0 | 120 | 3.3 |
| C. Ex. II-(1) | 0.3 | 20 | 100 | 3.0 | 120 | 3.3 |
| C. Ex. II-(2) | 0.08 | 20 | 100 | 3.0 | 120 | 3.3 |
| C. Ex. II-(3) | 0.3 | 20 | 110 | 3.0 | 120 | 3.0 |

|  | X-ray diffraction intensity ratio | average glossiness | static friction coefficient | optical density | L* | C* | 2L* + C* | transport ability |
|---|---|---|---|---|---|---|---|---|
| Ex. II-(1) | 0.08 | 76 | 0.48 | 0.8 | 93 | 6 | 192 | ○ |
| Ex. II-(2) | 0.08 | 68 | 0.44 | 1.3 | 94 | 6 | 194 | ○ |
| Ex. II-(3) | 0.05 | 79 | 0.51 | 1.0 | 93 | 6 | 192 | ○ |

TABLE 2-continued

| | | | | | | | | |
|---|---|---|---|---|---|---|---|---|
| Ex. II-(4) | 0.15 | 66 | 0.43 | 0.9 | 93 | 6 | 192 | ○ |
| Ex. II-(5) | 0.08 | 83 | 0.53 | 0.7 | 95 | 5 | 195 | ○ |
| C. Ex. II-(1) | 0.08 | 61 | 0.38 | 1.2 | 93 | 3 | 189 | ○ |
| C. Ex. II-(2) | 0.1 | 98 | 0.63 | 1.1 | 94 | 14 | 202 | × |
| C. Ex. II-(3) | 0.2 | 63 | 0.41 | 1.5 | 93 | 9 | 195 | ○ |

Ex.: Example
C. Ex.: Comparative Example

Example III and Comparative Example III

Anatase titanium oxide particles and other inert particles shown in Table 3 were added to polyethylene terephthalate, melt extruded at 280° C. and solidified by cooling to obtain an unstretched film. This unstretched film was stretched in a longitudinal direction and then a transverse direction under conditions shown in Table 3 and heat set to obtain a 100 μm thick white film. Right after stretching in the longitudinal direction, the white film was coated with an aqueous solution composed of 65 wt % of a copolyester (Tg=30° C.) consisting of terephthalic acid (60 mol %), isophthalic acid (37 mol %) and 5-Na sulfoisophthalic acid (3 mol %) as acid components and ethylene glycol (40 mol %), neopentyl glycol (40 mol %) and bisphenol A adduct with ethylene oxide (20 mol %) as glycol components, 16 wt % of polyethylene oxide having a molecular weight of 1,000, 10 wt % of crosslinked acrylic resin particles having an average particle diameter of 40 nm and 9 wt % of polyoxyethylene nonylphenyl ether, and having a solid content of 4 wt % by a roll coater. The characteristic properties of this laminate film are shown in Table 3.

then stretched to 3.6 times in a mechanical axis direction and coated with an aqueous solution composed of 65 wt % of a copolyester (Tg=30° C., to be simply referred to as "E" hereinafter)) which consisted of terephthalic acid (60 mol %), isophthalic acid (36 mol %) and 5-Na sulfoisophthalic acid (4 mol %) as acid components and ethylene glycol (60 mol %) and neopentyl glycol (40 mol %) as glycol components, 16 wt % of a polyvinyl alcohol having a saponification degree of 86 to 89 mol %, 10 wt % of crosslinked acrylic resin particles having an average particle diameter of 40 nm and 9 wt % of polyoxyethylene lauryl ether, and having a solid content of 4 wt % by a roll coater.

The longitudinally stretched film coated with the aqueous solution was stretched to 4 times in a transverse direction while it was dried, and then heat set at 230° C. to obtain a 100 μm thick biaxially oriented film.

The film had a coating film thickness of 0.03 μm, a center line average surface roughness of 15 nm, a surface energy of 60 mN/m and a thermal shrinkage factor in a longitudinal direction of 0.9% and in a transverse direction of 0.2%. The characteristic properties of this laminate film are shown in Table 4.

TABLE 3

| | titanium oxide | | lubricant (second component) | | | longitudinal stretching conditions | | transverse stretching conditions | |
|---|---|---|---|---|---|---|---|---|---|
| | particle diameter μm | amount wt % | type | particle diameter μm | amount wt % | temperature ° C. | draw ratio | temperature ° C. | draw ratio |
| Ex. III-(1) | 0.3 | 10 | silica | 0.03 | 0.05 | 100 | 3.0 | 120 | 3.3 |
| Ex. III-(2) | 0.3 | 20 | silica | 0.03 | 0.05 | 100 | 3.0 | 120 | 3.3 |
| Ex. III-(3) | 0.3 | 10 | silica | 0.03 | 0.05 | 110 | 3.0 | 120 | 3.5 |
| Ex. III-(4) | 0.3 | 10 | siiica | 0.03 | 0.05 | 110 | 3.0 | 120 | 3.1 |
| Ex. III-(5) | 0.3 | 5 | silica | 1.50 | 0.50 | 100 | 3.0 | 120 | 3.3 |
| C. Ex. III-(1) | 0.5 | 20 | silica | 0.03 | 0.05 | 100 | 3.0 | 120 | 3.3 |
| C. Ex. III-(2) | 0.3 | 20 | none | — | — | 100 | 3.0 | 120 | 3.3 |
| C. Ex. III-(3) | 0.3 | 20 | silica | 0.03 | 0.05 | 110 | 3.0 | 120 | 3.0 |

| | X-ray diffraction intensity ratio | average glossiness | optical density | L* | C* | 2L* + C* | transport ability |
|---|---|---|---|---|---|---|---|
| Ex. III-(1) | 0.10 | 75 | 0.8 | 93 | 14 | 200 | ○ |
| Ex. III-(2) | 0.10 | 70 | 1.3 | 94 | 14 | 202 | ○ |
| Ex. III-(3) | 0.05 | 78 | 1.0 | 93 | 14 | 200 | ○ |
| Ex. III-(4) | 0.15 | 65 | 0.9 | 93 | 14 | 200 | ○ |
| Ex. III-(5) | 0.10 | 68 | 0.7 | 95 | 5 | 195 | ○ |
| C. Ex. III-(1) | 0.10 | 60 | 1.2 | 93 | 3 | 189 | ○ |
| C. Ex. III-(2) | 0.10 | 78 | 1.1 | 94 | 14 | 202 | × |
| C. Ex. III-(3) | 0.20 | 63 | 1.5 | 93 | 9 | 195 | ○ |

Ex.: Example
C. Ex.: Comparative Example

Example IV-1

A polyester (intrinsic viscosity of 0.62) composed of a terephthalic acid component and an ethylene glycol component was melt extruded onto a rotary cooling drum maintained at 20° C. to obtain an unstretched film which was Comparative Example IV-(1)

The characteristic properties of a biaxially oriented polyester film obtained in the same manner as in Example IV-(1) except that the aqueous solution was not coated are shown in Table 4.

Examples IV-(2) to IV-(12)

Biaxially oriented polyester films were obtained in the same manner as in Example IV-(1) except that the type and amount of the coating agent was changed as shown in Table 4. The characteristic properties of this laminate film are shown in Table 4.

TABLE 4

| | composition of coating film layer | | | | | | | |
|---|---|---|---|---|---|---|---|---|
| | (A) copolyester | | (B) water-soluble polymer | | (C) fine particles | | | surface |
| | type (note 1) | wt % | type (note 2) | wt % | type (note 3) | wt % | adhesion | energy (mN/m) |
| Ex. IV-(1) | E | 65 | P | 16 | M | 10 | A | 60 |
| Ex. IV-(2) | E | 70 | P | 11 | M | 10 | A | 57 |
| Ex. IV-(3) | E | 65 | Q | 16 | M | 10 | A | 58 |
| Ex. IV-(4) | E | 65 | R | 16 | M | 10 | A | 56 |
| Ex. IV-(5) | F | 65 | P | 16 | M | 10 | A | 60 |
| Ex. IV-(6) | F | 70 | P | 16 | M | 10 | A | 56 |
| Ex. IV-(7) | F | 60 | P | 21 | M | 10 | A | 63 |
| Ex. IV-(8) | E | 65 | T | 16 | M | 10 | A | 64 |
| Ex. IV-(9) | E | 65 | U | 16 | M | 10 | A | 64 |
| Ex. IV-(10) | E | 65 | W | 16 | M | 10 | A | 58 |
| Ex. IV-(11) | E | 65 | X | 16 | M | 10 | A | 57 |
| Ex. IV-(12) | E | 68 | P | 16 | N | 10 | A | 59 |
| C. Ex. IV-(1) | — | | — | | — | 7 | C | 47 |

Ex.: Example
C. Ex.: Comparative Example

As is obvious from the results shown in Table 4, the polyester film for an ink jet printer image receiving layer of the present invention has excellent adhesion.

In Table 4, the types E and F of copolyester (note 1) are the following copolymers.

E: copolymer (Tg=30° C.) consisting of terephthalic acid (60 mol %), isophthalic acid (36 mol %) and 5-Na sulfoisophthalic acid (4 mol %)/ethylene glycol (60 mol %) and neopentyl glycol (40 mol %)

F: copolymer (Tg=42° C.) consisting of 2,6-naphthalenedicarboxylic acid (20 mol %), isophthalic acid (76 mol %) and 5-K sulfoterephthalic acid (4 mol %)/ethylene glycol (50 mol %) and neopentyl glycol (50 mol %)

In Table 4, the types P, Q, R, T, U, W and X (note 2) of water-soluble polymer compound are the following compounds.

P: polyvinyl alcohol having a saponification degree of 86 to 89 mol %

Q: polyvinyl alcohol having a saponification degree of 76 to 82 mol %

R: polyvinyl alcohol having a saponification degree of 91 to 94 mol %

T: polyvinyl pyrrolidone having a K value of 26 to 23 and an average molecular weight of 40,000

U: polyvinyl pyrrolidone having a K value of 90 to 100 and an average molecular weight of 1,200,000

W: cation modified polyvinyl alcohol having a saponification degree of 74 to 80 mol %

X: cation modified polyvinyl alcohol having a saponification degree of 86 to 91 mol %

In Table 4, the types M and N (note 3) of fine particles are the following compounds.

M: crosslinked acrylic resin particles having an average particle diameter of 40 nm N: colloidal silica particles having an average particle diameter of 80 nm

Examples IV-(13) to IV-(16) and Comparative Examples IV-(2) and IV-(3)

Biaxially oriented polyester films were obtained in the same manner as in Example IV-(1) except that the type of copolyester (A) of the coating film layer was changed as shown in Table 5 and Table 6 and copolyesters having different Tg's were used. The characteristic properties of the obtained laminate films are shown in Table 5.

TABLE 5

| | type of (A) (note 4) | Tg of (A) (° C.) | antiblock properties | adhesion |
|---|---|---|---|---|
| Ex. IV-(13) | G | 24 | good | A |
| EX. IV-(14) | H | 45 | excellent | A |
| Ex. IV-(15) | I | 65 | excellent | A |
| Ex. IV-(16) | J | 79 | excellent | B |
| C. EX. IV-(2) | K | 17 | poor | A |
| C. Ex. IV-(3) | L | 98 | excellent | C |

Ex.: Example
C. Ex.: Comparative Example

TABLE 6

| copolymerizable component | (note 4) abbreviation of (A) | copolymerizable component of (A) (unit: mol %) | | | | | |
|---|---|---|---|---|---|---|---|
| | | G | H | I | J | K | L |
| terephthalic acid | | 60 | 46 | 70 | | 16 | 19 |
| isophthalic acid | | 30 | 40 | 24 | 36 | 80 | |
| 2,6-naphthalenedicarboxylic acid | | | 10 | | 60 | | 77 |
| 5-Na sulfoisophthalic aid | | | 4 | 6 | 4 | 4 | 4 |
| 5-K sulfoisophthalic acid | | 4 | | | | | |
| ethylene glycol | | 5 | 60 | 60 | 70 | | 90 |
| diethylene glycol | | 3 | 2 | 3 | | 5 | |
| 1,4-butanediol | | 42 | 2 | | 10 | 60 | |
| neopentyl glycol | | 50 | 36 | 37 | 20 | 35 | 10 |

As is obvious from the results shown in Table 5, the polyester film for an ink jet printer image receiving of the present invention has excellent antiblock properties and adhesion.

Examples IV-(17) to IV-(21) and Comparative Examples IV-(4) and IV-(5)

Biaxially oriented polyester films were obtained in the same manner as in Example IV-(1) except that the proportion of the dicarboxylic acid component containing a sulfonate group of the copolyester (A) was changed as shown in Table 7. The characteristic properties of the obtained laminate films are shown in Table 7.

TABLE 7

| | proportions of dicarboxylic acid components of copolyester (A) (mol %) | | | | |
|---|---|---|---|---|---|
| | 5-Na sulfo-isophthalic acid | tere-phthalic acid | iso-phthalic acid | water dispersibility | humidity resistance |
| Ex. IV-(17) | 1 | 60 | 39 | good | excellent |
| Ex. IV-(18) | 2 | 60 | 38 | excellent | excellent |
| Ex. IV-(19) | 6 | 60 | 34 | excellent | excellent |
| Ex. IV-(20) | 12 | 60 | 28 | excellent | excellent |
| Ex. IV-(21) | 16 | 60 | 24 | excellent | good |
| C. Ex. IV-(4) | 0 | 60 | 40 | poor | excellent |
| C. Ex. IV-(5) | 20 | 60 | 20 | excellent | poor |

Ex.: Example
C. EX.: Comparative Example

As is obvious from the results shown in Table 7, the coating agent of the present invention is excellent in water dispensability and the polyester film for an ink jet printer image receiving of the present invention is excellent in humidity resistance.

Examples IV-(22) to IV-(24) and Comparative Examples IV-(6) to IV-(9)

Biaxially oriented polyester films were obtained in the same manner as in Example IV-(1) except that the ratio of the copolyester (A), the water-soluble polymer (B) and fine particles (C) was changed as shown in Table 8. The characteristic properties of the obtained laminate films are shown in Table 8.

TABLE 8

| | composition of coating film layer | | | | | | | |
|---|---|---|---|---|---|---|---|---|
| | (A) copolyester | | (B) water-soluble polymer | | (C) fine particles | | | friction | surface energy |
| | type | wt % | type | wt % | type | wt % | adhesion | coefficient | (mN/m) |
| Ex. IV-(22) | H | 55 | P | 26 | M | 10 | A | 0.32 | 65 |
| Ex. IV-(23) | H | 61 | P | 20 | M | 10 | A | 0.33 | 62 |
| Ex. IV-(24) | H | 70 | P | 11 | M | 10 | A | 0.38 | 58 |
| C. Ex. IV-(6) | H | 50 | P | 40 | M | 10 | B | 0.69 | 70 |
| C. Ex. IV-(7) | H | 79 | P | 2 | M | 10 | C | 0.32 | 51 |
| C. Ex. IV-(8) | H | 31 | P | 50 | M | 10 | C | 0.62 | 70 |
| C. Ex. IV-(9) | H | 74 | P | 7 | M | 10 | C | 0.34 | 53 |

Ex.: Example
C. Ex.: Comparative Example

As is obvious from the results shown in Table 8, the polyester film for receiving an ink jet printer image of the present invention is excellent in adhesion and transportability.

Examples IV-(25) and IV-(26) and Comparative Examples IV-(10) and IV-(11)

Biaxially oriented polyester films were obtained in the same manner as in Example IV-(1) except that the particle diameter of the fine particles (C) was changed as shown in Table 9. The characteristic properties of the obtained laminate films are shown in Table 9.

TABLE 9

| | average particle diameter of fine particles (C) (nm) | antiblock properties |
|---|---|---|
| Ex. IV-(25) | 20 | good |
| Ex. IV-(26) | 80 | excellent |
| C. Ex. IV-(10) | 10 | poor |
| C. Ex. IV-(11) | 130 | excellent |

Ex.: Example
C. Ex.: Comparative Example

As is obvious from the results shown in Table 9, the polyester film for receiving an ink jet printer image of the present invention is excellent in antiblock properties.

Examples IV-(27) and IV-(28) and Comparative Examples IV-(12) and IV-(13)

Biaxially oriented polyester films were obtained in the same manner as in Example IV-(1) except that the ratio of the copolyester (A), the water-soluble polymer (B) and the fine particles (C) was changed as shown in Table 10. The characteristic properties of the obtained laminate films are shown in Table 10.

TABLE 10

| | (A) copolyester | | (B) water-soluble polymer | | (C) fine particles | | friction coefficient |
|---|---|---|---|---|---|---|---|
| | type | wt % | type | wt % | type | wt % | ($\mu$s) |
| Ex. IV-(27) | H | 72 | P | 16 | M | 3 | 0.39 |
| Ex. IV-(28) | H | 55 | P | 16 | M | 20 | 0.3 |

TABLE 10-continued

| | (A) copolyester | | (B) water-soluble polymer | | (C) fine particles | | friction coefficient |
|---|---|---|---|---|---|---|---|
| | type | wt % | type | wt % | type | wt % | (μs) |
| C. Ex. IV-(12) | H | 74 | P | 16 | M | 1 | 0.62 |
| C. Ex. IV-(13) | H | 48 | P | 16 | M | 27 | 0.31 |

Ex.: Example
C. Ex.: Comparative Example

As is obvious from the results shown in Table 10, the polyester film for receiving an ink jet printer image of the present invention is excellent in transportability.

Example IV-(29)

A composition consisting of 90 wt % of a polyester (intrinsic viscosity of 0.62) composed of a terephthalic acid component and an ethylene glycol component and 10 wt % of titanium oxide was melt extruded onto a rotary cooling drum maintained at 20° C. to obtain an unstretched film which was then stretched to 3.6 times in a mechanical axis direction and coated with an aqueous solution composed of 65 wt % of a copolyester (Tg=30° C., to be simply referred to as "E" hereinafter)) consisting of terephthalic acid (60 mol %), isophthalic acid (36 mol %) and 5-Na sulfoisophthalic acid (4 mol %) as acid components and ethylene glycol (60 mol %) and neopentyl glycol (40 mol %) as glycol components, 16 wt % of a polyvinyl alcohol having a saponification degree of 86 to 89 mol %, 10 wt % of crosslinked acrylic resin particles having an average particle diameter of 40 nm and 9 wt % of polyoxyethylene lauryl ether, and having a solid content of 4 wt % by a roll coater.

The longitudinally stretched film coated with the aqueous solution was stretched to 4 times in a transverse direction while it was dried, and then heat set at 230° C. to obtain a 100 μm thick biaxially oriented film. The film had a coating film thickness of 0.03 μm, a center line average surface roughness of 59 nm, a glossiness of 65, a light transmittance of 3% and a thermal shrinkage factor in a longitudinal direction of 0.9% and in a transverse direction of 0.2% and was excellent in sharpness and adhesion.

Comparative Example IV-(14)

A biaxially oriented polyester film was obtained in the same manner as in Example IV-(29) except that the copolyester (A) of Example IV-(29) was changed to L. This film had a coating film thickness of 0.03 μm, a center line average surface roughness of 120 nm, a glossiness of 41, a light transmittance of 3% and a thermal shrinkage factor in a longitudinal direction of 0.9% and in a transverse direction of 0.2% and was unsatisfactory in terms of sharpness and adhesion.

Example V-(1)

A polyester (intrinsic viscosity of 0.62) composed of a terephthalic acid component and an ethylene glycol component was melt extruded onto a rotary cooling drum maintained at 20° C. to obtain an unstretched film which was then stretched to 3.6 times in a mechanical axis direction and coated with an aqueous solution composed of 51 wt % of a copolyester i.e., the copolyester (A), (Tg=40° C., to be simply referred to as "E" hereinafter)) which consisted of terephthalic acid (60 mol %), isophthalic acid (36 mol %) and 5-Na sulfoisophthalic acid (4 mol %) as acid components and ethylene glycol (70 mol %) and neopentyl glycol (30 mol %) as glycol components, 20 wt % of a polyvinyl alcohol having a saponification degree of 86 to 89 mol %, 10 wt % of crosslinked acrylic resin particles having an average particle diameter of 40 nm, 10 wt % of a compound (Y) represented by the following formula (II) and 9 wt % of polyoxyethylene lauryl ether, and having a solid content of 4 wt % by a roll coater. The longitudinally stretched film coated with the aqueous solution was stretched to 4 times in a transverse direction while it was dried, and then heat set at 230° C. to obtain a 100 μm thick biaxially oriented film. The film had a coating film thickness of 0.03 μm, a center line average surface roughness of 15 nm, a surface energy of 61 mN/m and a thermal shrinkage factor in a longitudinal direction of 0.9% and in a transverse direction of 0.2%. The characteristic properties of this film are shown in Table 11.

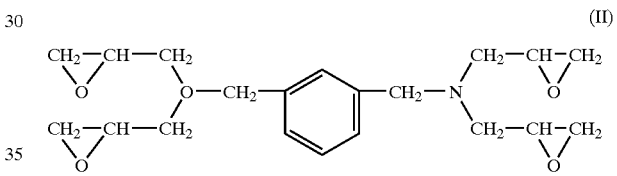

(II)

Comparative Example V-(1)

The characteristic properties of a biaxially oriented polyester film obtained in the same manner as in Example V-(1) except that the aqueous solution was not coated are shown in Table 11.

Examples V-(2) to V-(10)

Biaxially oriented polyester films were obtained in the same manner as in Example V-(1) except that the composition of the coating film layer was changed as shown in Table 11. The characteristic properties of the obtained laminate films are shown in Table 11.

TABLE 11

| | composition of coating film layer | | | | | | | | | |
|---|---|---|---|---|---|---|---|---|---|---|
| | (A) copolyester | | (B) water-soluble polymer | | (C) fine particles | | (D) cross-linking agent | | adhesion | | surface energy (mN/m) |
| | type (note 1) | wt % | type (note 2) | wt % | type (note 3) | wt % | type (note 4) | wt % | before printing | after printing | |
| Ex. V-(1) | E-1 | 51 | P | 20 | M | 10 | Y | 10 | A | A | 61 |
| Ex. V-(2) | H-1 | 51 | P | 20 | M | 10 | Y | 10 | A | A | 57 |
| Ex. V-(3) | E-1 | 51 | Q | 20 | M | 10 | Y | 10 | A | A | 60 |
| Ex. V-(4) | E-1 | 51 | R | 20 | M | 10 | Y | 10 | A | A | 56 |

TABLE 11-continued

| | composition of coating film layer | | | | | | | | | |
|---|---|---|---|---|---|---|---|---|---|---|
| | (A) copolyester | | (B) water-soluble polymer | | (C) fine particles | | (D) cross-linking agent | | adhesion | | surface energy (mN/m) |
| | type (note 1) | wt % | type (note 2) | wt % | type (note 3) | wt % | type (note 4) | wt % | before printing | after printing | |
| Ex. V-(5) | E-1 | 51 | T | 20 | M | 10 | Y | 10 | A | A | 63 |
| Ex. V-(6) | E-1 | 51 | U | 20 | M | 10 | Y | 10 | A | A | 64 |
| Ex. V-(7) | E-1 | 51 | W | 20 | M | 10 | Y | 10 | A | A | 64 |
| Ex. V-(8) | E-1 | 51 | X | 20 | M | 10 | Y | 10 | A | A | 58 |
| Ex. V-(9) | E-1 | 51 | P | 20 | M | 10 | Z | 10 | A | A | 57 |
| Ex. V-(10) | E-1 | 54 | P | 20 | N | 7 | Y | 10 | A | A | 59 |
| C. Ex. V-(1) | — | | — | | — | | | | C | | 45 |

Ex.: Example
C. Ex.: Comparative Example

As is obvious from the results shown in Table 11, the polyester film for receiving an ink jet printer image of the present invention is excellent in adhesion.

In Table 11, Table 12 and Table 14, the type (Note 1) of copolyester (A) denoted by E-1 is the following compound.
E-1: copolyester (Tg=40°) consisting of terephthalic acid (60 mol %), isophthalic acid (36 mol %) and 5-Na sulfoisophthalic acid (4 mol %)/ethylene glycol (70 mol %) and neopentyl glycol (30 mol %)

In Table 11, Table 12 and Table 14, the types (Note 2) of water-soluble polymer (B) denoted by P, Q, R, T, U, W and X are the following compounds.
P: polyvinyl alcohol having a saponification degree of 86 to 89 mol %
Q: polyvinyl alcohol having a saponification degree of 76 to 82 mol %
R: polyvinyl alcohol having a saponification degree of 91 to 94 mol %
T: polyvinylpyrrolidone having a K value of 26 to 23 and an average molecular weight of 40,000
U: polyvlnylpyrrolidone having a K value of 90 to 100 and an average molecular weight of 1,200,000
W: cation modified polyvinyl alcohol having a saponification degree of 74 to 80 mol %
X: cation modified polyvinyl alcohol having a saponification degree of 86 to 91 mol %

In Table 11, Table 12 and Table 14, the types (Note 3) of fine particles (C) denoted by M and N are the following compounds.
M: crosslinked acrylic particles having an average particle diameter of 40 nm
N: colloidal silica particles having an average particle diameter of 80 nm In Table 11, Table 12 and Table 14, the types (Note 4) of crosslinking agent (D) denoted by Y and Z are compounds represented by the following formulas (II) and (III).

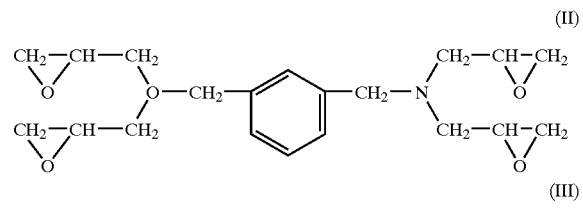

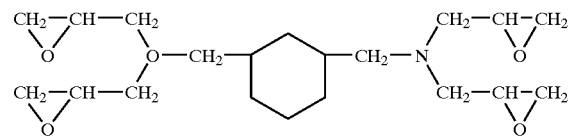

Examples V-(11) to V-(14) and Comparative Examples V-(2) to V-(5)

Biaxially oriented polyester films were obtained in the same manner as in Example V-(1) except that the ratio of the copolyester (A), water-soluble polymer (B), fine particles (C) and crosslinking agent (D) was changed as shown in Table 12. The characteristic properties of the obtained laminate films are shown in Table 12.

TABLE 12

| | composition of coating film layer | | | | | | | | | | | |
|---|---|---|---|---|---|---|---|---|---|---|---|---|
| | (A) copolyester | | (B) water-soluble polymer | | (C) fine particles | | (D) crosslinking agent | | adhesion | | friction coefficient | surface energy (mN/m) |
| | type (note 1) | wt % | type (note 2) | wt % | type (note 3) | wt % | type (note 4) | wt % | before printing | after printing | | |
| Ex. V-(11) | E-1 | 41 | P | 30 | M | 10 | Y | 10 | A | A | 0.32 | 60 |
| Ex. V-(12) | E-1 | 60 | P | 11 | M | 10 | Y | 10 | A | A | 0.33 | 58 |
| Ex. V-(13) | E-1 | 46 | P | 20 | M | 10 | Y | 15 | A | A | 0.38 | 56 |
| Ex. V-(14) | E-1 | 54 | P | 20 | M | 10 | Y | 7 | A | A | 0.37 | 55 |
| C. Ex. V-(2) | E-1 | 21 | P | 50 | M | 10 | Y | 10 | C | C | 0.69 | 65 |

TABLE 12-continued

| | composition of coating film layer | | | | | | | | | | |
|---|---|---|---|---|---|---|---|---|---|---|---|
| | (A) copolyester | | (B) water-soluble polymer | | (C) fine particles | | (D) crosslinking agent | | adhesion | | |
| | type (note 1) | wt % | type (note 2) | wt % | type (note 3) | wt % | type (note 4) | wt % | before printing | after printing | friction coefficient | surface energy (mN/m) |
| C. Ex. V-(3) | E-1 | 64 | P | 7 | M | 10 | Y | 10 | C | C | 0.32 | 51 |
| C. Ex. V-(4) | E-1 | 61 | P | 20 | M | 10 | Y | 0 | A | C | 0.34 | 61 |
| C. Ex. V-(5) | E-1 | 31 | P | 20 | M | 10 | Y | 30 | C | C | 0.65 | 59 |

Ex.: Example
C. Ex.: Comparative Example

As is obvious from the results shown in Table 12, the polyester film for receiving an ink jet printer image of the present invention is excellent in adhesion and transportability.

Examples V-(15) and V-(16) and Comparative Examples V-(6) and V-(7)

Biaxially oriented polyester films were obtained in the same manner as in Example V-(1) except that the particle diameter of the fine particles (C) was changed as shown in Table 13. The characteristic properties of the obtained films are shown in Table 13.

TABLE 13

| | average particle diameter of fine particles (C) (nm) | antiblock properties |
|---|---|---|
| Ex. V-(15) | 20 | good |
| Ex. V-(16) | 80 | excellent |
| C. Ex. V-(6) | 10 | poor |
| C. Ex. V-(7) | 130 | excellent |

Ex.: Example
C. Ex.: Comparative Example

As is obvious from the results shown in Table 13, the polyester film for receiving an ink jet printer image of the present invention is excellent in antiblock properties.

Examples V-(17) and V-(1) and Comparative Examples V-(8) and V-(9)

Biaxially oriented polyester films were obtained in the same manner as in Example V-(1) except that the ratio of the aqueous binder (A), water-soluble polymer (B), fine particles (C) and crosslinking agent (D) was changed as shown in Table 14. The characteristic properties of the obtained laminate films are shown in Table 14.

TABLE 14

| | composition of coating film layer | | | | | | | | |
|---|---|---|---|---|---|---|---|---|---|
| | (A) copolyester | | (B) water-soluble polymer | | (C) fine particles | | (D) crosslinking agent | | friction coefficient (μs) |
| | type (note 1) | wt % | type (note 2) | wt % | type (note 3) | wt % | type (note 4) | wt % | |
| Ex. V-(17) | E-1 | 58 | P | 20 | M | 3 | Y | 10 | 0.38 |
| Ex. V-(18) | E-1 | 41 | P | 20 | M | 20 | Y | 10 | 0.31 |
| C. Ex. V-(8) | E-1 | 60 | P | 20 | M | 1 | Y | 10 | 0.68 |
| C. Ex. V-(9) | E-1 | 34 | P | 20 | M | 27 | Y | 10 | 0.30 |

Ex.: Example
C. Ex.: Comparative Example

As is obvious from the results shown in Table 14, the polyester film for receiving an ink jet printer image of the present invention is excellent in transportability.

Example V-(19)

A composition consisting of 90 wt % of a polyester (intrinsic viscosity of 0.62) composed of a terephthalic acid component and an ethylene glycol component and 10 wt % of titanium oxide was melt extruded onto a rotary cooling drum maintained at 20° C. to obtain an unstretched film which was then stretched to 3.6 times in a mechanical axis direction and coated with an aqueous solution composed of 51 wt % of a copolyester, i.e., the copolyester (A), (Tg=40° C.) which consisted of terephthalic acid (60 mol %), isophthalic acid (36 mol %) and 5-Na sulfoisophthalic acid (4 mol %) as acid components and ethylene glycol (70 mol %) and neopentyl glycol (30 mol %) as glycol components, 20 wt % of a polyvinyl alcohol having a saponification degree of 86 to 89 mol %, 10 wt % of crosslinked acrylic resin particles having an average particle diameter of 40 nm, 10 wt % of a crosslinking agent represented by the following formula (II) and 9 wt % of polyoxyethylene lauryl ether, and having a solid content of 4 wt % by a roll coater. Thereafter, the longitudinally stretched film coated with the aqueous solution was stretched to 4 times in a transverse direction while it was dried and further heat set at 230° C. to obtain a 100 μm thick biaxially oriented film. This film had a coating film thickness of 0.03 μm, a center line average surface roughness of 58 nm, a glossiness of 67, a light transmittance of 3% and a thermal shrinkage factor in a longitudinal direction of 0.9% and in a transverse direction of 0.2% and was excellent in sharpness and adhesion.

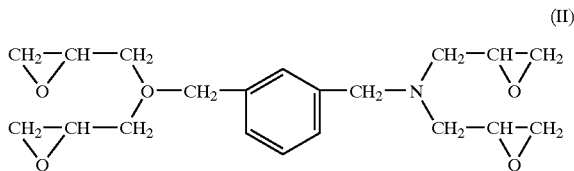

(II)

What is claimed is:

1. A white biaxially oriented polyester ink jet recording film for use as a base film for receiving an ink jet printer image, which satisfies the following requirements (1) to (7):
   (1) the content of titanium oxide particles having an average particle diameter of 0.1 to 0.5 μm in the polyester film is 5 to 20 wt %;
   (2) the polyester film has an average glossiness of 65 to 95%;
   (3) the polyester film has an X-ray diffraction intensity ratio (F-1/F-2) represented by the following formula (1):

$$0.05 \leq F\text{-}1/F\text{-}2 \leq 0.15 \tag{1}$$

wherein (F-1) is an X-ray diffraction intensity on a plane ($\overline{1}10$) parallel to the surface of the film and (F-2) is an X-ray diffraction intensity on a plane (100) parallel to the surface of the film;
   (4) the polyester film has a static friction coefficient of 0.3 to 0.6;
   (5) the polyester film has a thickness of 100 to 250 μm.
   (6) the polyester film has such whiteness that lightness (L*) and chroma (C*) defined in CIE 1976 satisfy the following expressions (1) to (3):

$$L^* \geq 90 \tag{1}$$
   $$C^* \geq 3 \tag{2}$$
   $$2L^* + C^* \geq 190 \tag{3}$$

provided that $C^* = \{(a^*)^2 + (b^*)^2\}^{1/2}$; and
   (7) the polyester film has an optical density of 0.7 to 1.6.

2. A white biaxially oriented polyester laminate film for use as a base film for receiving an ink jet printer image wherein a coating film layer substantially made of the following components (A) to (C) is formed on at least one side of the white biaxially oriented polyester film of claim 1;
   (A) 50 to 80 wt % of a copolyester having a secondary transition point of 20 to 90° C.;
   (B) 10 to 30 wt % of a water-soluble polymer compound; and
   (C) 3 to 25 wt % of fine particles having an average particle diameter of 20 to 80 nm.

3. The film of claim 1, wherein the polyester film has a thermal shrinkage factor of 2% or less when it is kept at 150° C. for 30 minutes.

4. The film of claim 1, wherein the polyester film has a center line average surface roughness (Ra) of 30 to 100 nm.

5. The film of claim 1, wherein the polyester film has a molecular orientation rate (MOR) of 1.1 to 4.0.

6. The film of claim 1, wherein the polyester film contains inert particles having an average particle diameter of 0.01 to 5.0 μm other than titanium oxide particles in an amount of 0.01 to 0.5 wt %.

7. The film of claim 1, wherein the polyester film is formed from polyethylene terephthalate.

8. The laminate film of claim 2, wherein the coating film layer has a surface energy of 50 to 70 mN/m.

9. The laminate film of claim 2, wherein the coating film layer is substantially made of (A) 55 to 75 wt % of a copolyester having a secondary transition point of 20 to 90° C., (B) 12 to 25 wt % of a water-soluble polymer and (C) 5 to 20 wt % of fine particles having an average particle diameter of 20 to 80 nm.

10. The laminate film of claim 2, wherein the copolyester (A) of the coating film layer contains a dicarboxylic acid(s) having a sulfonate group in an amount of 1 to 16 mol % based on the total of all the dicarboxylic acid components forming the copolyester.

11. The laminate film of claim 2, wherein the copolyester (A) of the coating film layer has a secondary transition point of 25 to 80° C.

12. The laminate film of claim 2, wherein the water-soluble polymer compound (B) of the coating film layer is at least one selected from the group consisting of a polyvinyl alcohol, polyvinyl pyrrolidone and polyethylene glycol.

13. The laminate film of claim 2, wherein the fine particles (C) of the coating film layer have an average particle diameter of 25 to 70 nm.

14. The laminate film of claim 2, wherein the coating film layer is formed by blending a polyfunctional epoxy compound into a composition substantially consisting of the components (A), (B) and (C).

15. A polyester laminate film for use as a base film for receiving an ink jet printer image which consists of a polyester film and a coating film layer formed on at least one side of the polyester film, wherein
   the coating film layer is substantially made of (A) 50 to 80 wt % of a copolyester containing a dicarboxylic acid component having a sulfonate group in an amount of 1 to 16 mol % based on the total of all the dicarboxylic acid components forming the copolyester and having a secondary transition point of 20 to 90° C., (B) 10 to 30 wt % of a water-soluble polymer compound and (C) 3 to 25 wt % of fine particles having an average particle diameter of 20 to 80 nm and has a surface energy of 50 to 70 mN/m.

16. A polyester laminate film for use as a base film for receiving an ink jet printer image which consists of a polyester film and a coating film layer formed on at least one side of the polyester film, wherein
   the coating film layer is substantially made of (A) 30 to 80 wt % of an aqueous binder, (B) 10 to 40 wt % of a water-soluble polymer, (C) 3 to 25 wt % of fine particles having an average particle diameter of 20 to 80 nm, and (D) 5 to 20 wt % of a polyfunctional epoxy compound crosslinking agent as the main ingredients and has a surface energy of 50 to 70 mN/m.

17. The laminate film of claim 16, wherein the polyfunctional epoxy compound crosslinking agent is represented by the following formula:

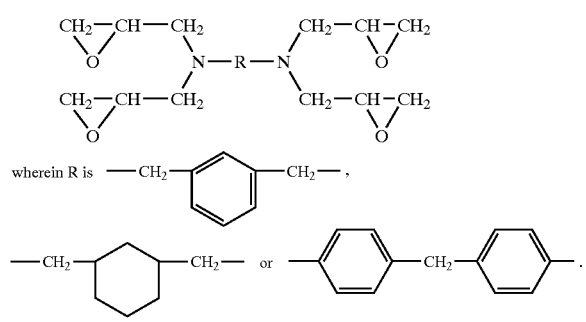

wherein R is

18. A white polyester laminate film for use as a base film for receiving an ink jet printer image which consists of a polyester film and a coating film layer formed from (A) a copolyester, (B) polyethylene glycol and (C) fine particles as the main ingredients on at least one side of the polyester film, wherein the polyester film contains 5 to 20 wt % of titanium oxide having an average particle diameter of 0.1 to 0.2 μm and 0.01 to 0.5 wt % of inert fine particles having an average particle diameter of 0.01 to 5.0 μm other than titanium oxide and has an average glossiness of 80.5 to 95 % and a static friction coefficient of 0.30 to 0.50.

19. A white polyester laminate film for use as a base film for receiving an ink jet printer image which consists of a polyester film and a coating film layer formed from (A) a copolyester, (B) polyethylene glycol and (C) fine particles as the main ingredients on at least one side of the polyester film, wherein the polyester film contains 5 to 20 wt % of titanium oxide having an average particle diameter of 0.2 to 0.5 μm and 0.01 to 0.5 wt % of inert fine particles having an average particle diameter of 0.01 to 5.0 μm other than titanium oxide and has an average glossiness of 65 to 80% and an X-ray diffraction intensity ratio (F-1/F-2) which satisfies the following expression (1):

$$0.05 \leq (F\text{-}1/F\text{-}2) \leq 0.15 \tag{1}$$

wherein (F-1) is an X-ray diffraction intensity on a plane ($\overline{1}10$) parallel to the surface of the film and (F-2) is an X-ray diffraction intensity on a plane (100) parallel to the surface of the film.

20. A base film for receiving an ink jet printer image having an ink image receiving layer on the surface of the coating film layer of the laminate film of claim 2.

21. A method of printing a polyester film, wherein the white biaxially oriented polyester laminate film of claim 2 receives an ink jet printer image.

* * * * *